July 20, 1965 P. M. DUCK 3,196,326

TRANSISTOR WITH MOUNTING PROVIDING EFFICIENT HEAT DISSIPATION THROUGH AN ENVELOPE AND METHOD OF MAKING THE SAME

Filed July 14, 1961 2 Sheets-Sheet 1

INVENTOR
PETER MARTIN DUCK
BY
Fuchtern, Fuchtern & Ottenger
ATTORNEYS

July 20, 1965 P. M. DUCK 3,196,326

TRANSISTOR WITH MOUNTING PROVIDING EFFICIENT HEAT DISSIPATION THROUGH AN ENVELOPE AND METHOD OF MAKING THE SAME

Filed July 14, 1961 2 Sheets-Sheet 2

INVENTOR
PETER MARTIN DUCK
BY
[signature]
ATTORNEYS

United States Patent Office 3,196,326

Patented July 20, 1965

3,196,326

TRANSISTOR WITH MOUNTING PROVIDING EFFICIENT HEAT DISSIPATION THROUGH AN ENVELOPE AND METHOD OF MAKING THE SAME

Peter Martin Duck, Stockport, England, assignor to The General Electric Company Limited, London, England Filed July 14, 1961, Ser. No. 124,066
12 Claims. (Cl. 317—234)

This invention relates to transistors.

The invention relates particularly to transistors of the kind comprising a semiconductor body having in contact therewith emitter, collector and base electrodes, said body and electrodes being housed within an envelope, at least the major part of which is metal, the semiconductor body being mounted on a relatively massive metallic member at least part of which forms the base electrode and which provides a good thermal connection between the semiconductor body and a metallic part of the envelope. Such a construction enables the heat generated in the transistor in operation to be efficiently dissipated.

According to the present invention, in a transistor of the kind specified a good thermal contact between said member and said metallic part of the envelope is obtained by virtue of a deformation of said metallic part of the envelope effected after said member has been placed in position relative to said metallic part of the envelope.

In a preferred embodiment in accordance with the invention, said member is secured in position within the envelope partly by virtue of said deformation.

Where the envelope of the transistor includes a second metallic part which is cold pressure welded to the first mentioned metallic part, said deformation may conveniently be brought about by the operation of welding said metallic parts together.

Two transistors in accordance with the invention will now be described, by way of example, with reference to the accompanying drawings in which.

Figure 1:
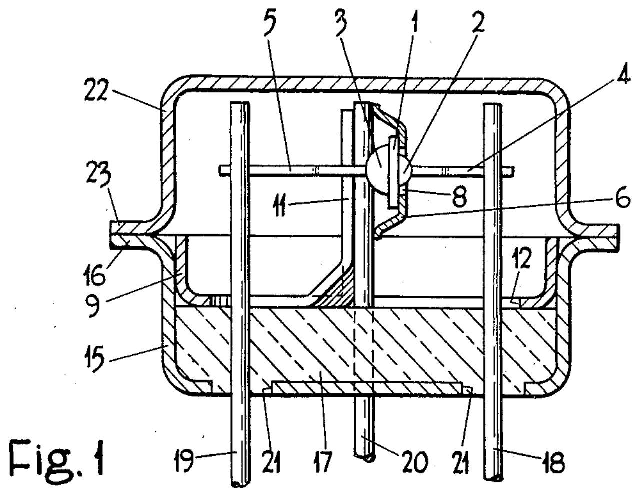
FIGURE 1 is sectional side view of the first transistor at a stage during its manufacture.
Figure 2:
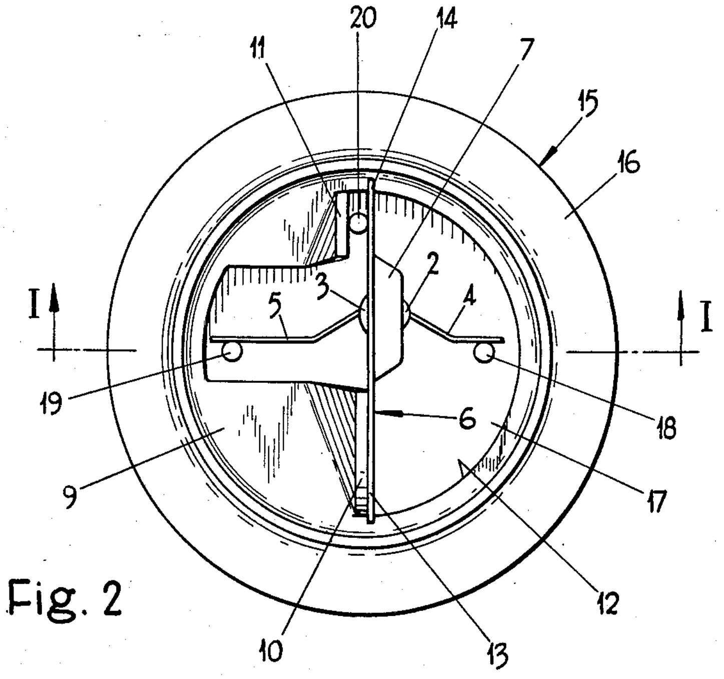
FIGURE 2 is a plan view of the transistor as shown in FIGURE 1 but with the part 22 removed.

Referring to FIGURES 1 and 2 of the drawings, the first transistor to be described is of the germanium junction type and includes a square wafer 1 of N-type germanium which is provided with emitter and collector electrodes 2 and 3 respectively which are centrally disposed on opposite main faces of the wafer 1. The emitter and collector electrodes 2 and 3 are formed in conventional manner by fusing small quantities of indium to the appropriate faces of the wafer 1 and are respectively provided with leads 4 and 5 in the form of thin metal strips whose ends are bonded to the electrodes 2 and 3.

The main face of the wafer 1 on which the emitter electrode 2 is formed is soldered to a base electrode 6 formed of tinned nickel sheet, the base electrode 6 being generally rectangular in shape but being deformed to provide a square well 7 whose centre is situated about one third of the way along the length of the base electrode 6 and centrally between its longer sides, the well 7 having sides of length somewhat less than one third of the length of the base electrode 6. The wafer 1 fits within the well 7, a circular aperture 8 having a diameter slightly less than the length of a side of a main face of the wafer 1 being formed centrally in the base of the well 7 to accommodate the emitter electrode 2.

The base electrode 6 is mounted on a support in the form of a shallow circular cylindrical copper cup 9 having an internal diameter slightly greater than the length of the base electrode 6. Two portions of the base of the cup 9 are bent up to form a pair of tags 10 and 11 projecting beyond the mouth of the cup 9, and lying in planes perpendicular to the base of the cup 9, and further portions of the base of the cup 9 are cut away to form a large aperture 12 whose purpose is described below. The tags 10 and 11 are disposed approximately diametrically opposite each other with respect to the cup 9, the tag 10 lying in a plane which diametrically bisects the cup 9, and the tag 11, which is narrower than the tag 10, lying in a plane parallel to and slightly spaced apart from the plane of the tag 10. The base electrode 6 is mounted on its support with its end portions 13 and 14 on either side of the well 7 lying in a plane perpendicular to the base of the cup 9, the longer end portion 13 having one main face spot welded to one main face of the tag 10 and the shorter end portion 14 being slightly spaced apart from the tag 11.

The unit described above is mounted on a second shallow circular cylindrical copper cup 15 having formed around its mouth a flange 16 extending radially outwards, the cup 9 fitting snugly within the cup 15 with the base of the cup 9 resting on a glass disc 17 sealed into and filling the bottom of the cup 15, and with the mouth of the cup 9 located in the plane of the flange 16. Three wires 18, 19 and 20 extending perpendicularly to the bases of the cups 9 and 15 are sealed through the glass disc 17, these wires 18, 19 and 20 passing through the aperture 12 and projecting about as far as the tags 10 and 11 beyond the mouths of the cups 9 and 15. The wires 18 and 19 are respectively welded to the leads 4 and 5 and the wire 20 fits between the tag 11 and the end portion 14 of the base electrode 6 and is welded to both. At their other ends the wires 18, 19 and 20 pass out of the cup 15 via apertures 21 formed in its base.

The cup 15 forms part of the envelope of the transistor, the remainder of the envelope being constituted by a third circular cylindrical copper cup 22 having a radial flange 23 around its mouth, the cup 22 and its flange 23 being respectively of the same dimensions as the cup 15 and its flange 16.

Figure 3:
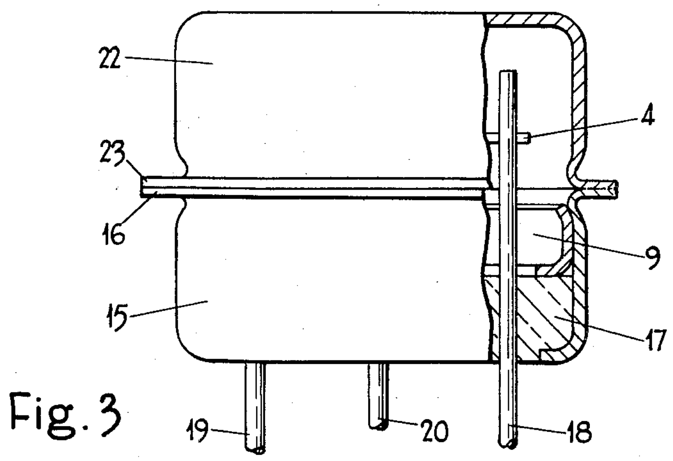
FIGURE 3 is a part-sectional side view of the first transistor after completion.

To complete the envelope the cup 22 is placed over the cup 15 with the flanges 16 and 23 in contact so as to enclose the unit mounted on the cup 15; the two parts of the envelope are then cold pressure welded together all around the flanges 16 and 23, the welding being carried out in an atmosphere of dry air to provide a suitable gaseous filling for the envelope. During the welding operation a flow of metal takes place radially inwards from the flanges 16 and 23 so that the parts of the walls of the cups 15 and 22 adjacent the flanges 16 and 23 are deformed inwards as is shown in FIGURE 3. As a result, the cup 9 is trapped tightly between the glass disc 17 and the wall of the cup 15 thereby securing the cup 9 firmly in position within the envelope and ensuring a good thermal contact between the cups 9 and 15. A good thermal connection between the wafer 1 and the envelope is thus provided via a relatively massive metallic member constituted by the base electrode 6 and the cup 9.

Figure 4:
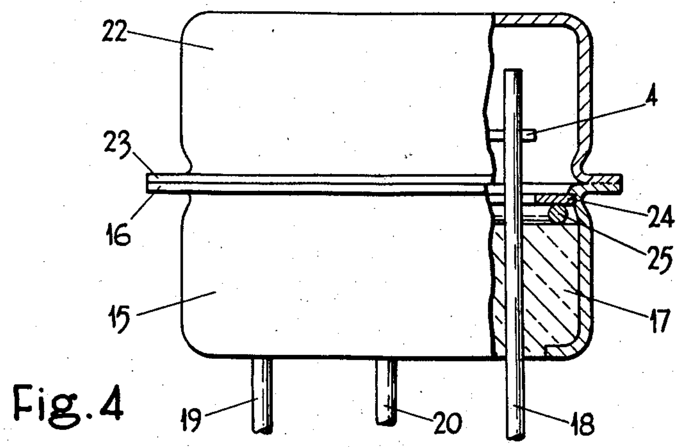
FIGURE 4 is a part-sectional side view of the second transistor after completion.

Referring now to FIGURE 4 of the accompanying drawings, the second transistor to be described is substantially identical to the transistor described above but the base electrode 6 is mounted on a support which is in the form of a circular copper disc 24 instead of being cup-shaped as for the transistor described above, the copper disc 24 being substantially identical in shape with the base of the cup-shaped support 9 of the transistor described above. The copper disc 24 rests on a wire ring 25 which is of slightly smaller diameter than the disc 24 and fits in the cup 15 between the disc 24 and the glass disc 17, the arrangement being such that before the two parts of the envelope are cold pressure welded together the disc 24 lies just within the cup 15 in a plane parallel to the plane of the flange 16. The deformation of the wall of the cup 15 effected by the welding together of the two parts of the envelope then causes the edge of the disc 24 to bite into the wall of the cup 15 thereby securing the disc 24 in position and ensuring good thermal contact between the disc 24 and the cup 15.

I claim:

1. A transistor comprising:

(a) a semiconductor body;

(b) emitter, collector and base electrodes in contact with said semiconductor body;

(c) a relatively massive metallic member having an annular periphery and on which the semiconductor body is mounted so that at least part of said massive member forms said base electrode;

(d) a hollow envelope of mainly cylindrical form at least the major part of which is of metal and within which said body, electrodes and massive member are housed;

(e) said massive member being disposed within a substantially tubular metal part of the envelope and supported with its periphery lying in a plane perpendicular to the tube axis and abutting the inner surface of the tubular envelope with the peripheral edge lying wholly within the space bounded by the envelope tube; and (f) said tubular envelope part including a radially inwardly deformed portion whose internal surface presses against the periphery of said massive member so that the massive member provides a good thermal connection between the semiconductor body and said envelope.

2. A transistor according to claim 1 wherein said tubular metal part of the envelope is provided by opposed cup-shaped parts having outwardly directed radial flanges sealed together in direct abutment, said massive metal member being supported with its periphery adjacent the cup mouths and in abutment with inwardly deformed parts of at least one of the cup walls.

3. A transistor comprising:

(a) a semiconductor body;

(b) emitter, collector and base electrodes in contact with said semiconductor body;

(c) a relatively massive metallic member having an annularly peripheried base carrying upstanding metal tags between which a metal support for the semiconductor body is mounted and at least part of which support forms said base electrode;

(d) a hollow envelope of mainly cylindrical form at least the major part of which is metal and within which said body, electrodes, support, and massive member are housed;

(e) said massive member being disposed with the plane of its base at right angles to the axis of the hollow cylindrical envelope, and with its periphery abutting the cylindrical inner wall of the envelope; and (f) said inner wall of the envelope including a radially inwardly deformed portion whose internal surface presses against the periphery of the base of the massive member so that the massive member provides a good thermal connection between the semiconductor body and said envelope.

4. A transistor according to claim 3 wherein said hollow cylindrical envelope comprises two opposed cup-shaped members each having a metal flange extending radially outwards from around its mouth, said two cup-shaped members being disposed coaxially with the flange of one cup-shaped member having that main face which lies in the plane of the mouth of that cup-shaped member sealed to the corresponding main face of the flange of the other cup-shaped member, and the periphery of the base of the said massive member is fixed in a position adjacent said mouth by an inwardly deformed part of the wall of the envelope.

5. A transistor according to claim 4 wherein the base of said massive metallic member is in the form of a shallow cylindrical metal cup disposed with the peripheral wall of the cup adjacent the mouth of one of said cup-shaped envelope members with a spacer separating the base of the massive metallic member from the base of that cup-shaped envelope member and the massive metallic member being fixed in position by the inwardly deformed part of the envelope wall pressing it against said spacer.

6. A transistor according to claim 4 wherein the base of said massive metallic member is in the form of a metal disc disposed with its peripheral edge adjacent the mouth of one of said cup-shaped envelope members with a wire ring separating the disc from a spacer intervening between the base of the metallic member and the base of the cup-shaped envelope member, and the massive metallic member being fixed in position by the inwardly deformed part of the envelope wall pressing it against said ring and spacer.

7. A transistor according to claim 5 wherein supply leads to said collector and emitter electrodes pass through apertures in the base of the massive metallic member and said cup-shaped envelope member, said spacer being of glass hermetically sealing the apertures in the cup-shaped envelope base and through which glass said supply leads are hermetically sealed.

8. A transistor according to claim 6 wherein supply leads to said collector and emitter electrodes pass through apertures in the base of the massive metallic member and said cup-shaped envelope member, said spacer being of glass hermetically sealing the apertures in the cup-shaped envelope base and through which glass said supply leads are hermetically sealed.

9. A transistor according to claim 7 wherein the semiconductor body is in the form of a wafer supported with its plane parallel to the envelope axis by the apertured base of a cup-shaped metal support member which provides the base electrode and which has outwardly turned edges fixed to the metal tags upstanding from the base of the massive metallic member, one of the other electrodes of the transistor extending through the aperture in the base of said cup-shaped metal support member and being connected to one of said supply leads, and the other electrode being connected to the other of said supply leads.

10. A method of mounting a transistor within an envelope so as to provide efficient heat dissipation for the transistor through the envelope, said method comprising:

(a) providing a semiconductor body having emitter, collector and base electrodes in contact therewith, the base electrode being constituted by at least part of a relatively massive metallic member on which said semiconductor body is mounted and which massive metallic member has an annular periphery;

(b) placing said semiconductor body, electrodes and massive member within a first cup-shaped hollow cylindrical metal envelope part having an outwardly directed radial flange at its mouth, the periphery of said massive member being a sliding fit within the cylindrical cup and the member being supported with its peripheral edge lying in a plane perpendicular to the cup axis, adjacent to the cup mouth, and wholly within the space bounded by the cup walls;

(c) placing a second cup-shaped hollow cylindrical metal envelope part having an outwardly directed radial flange invertedly over said first cup-shaped envelope part so as to enclose said semiconductor body, electrodes and massive member by abutting said radial flanges; and (d) sealing said envelope by cold pressure welding said radial flanges together and in so doing radially inwardly deforming a portion of the internal surface of at least one of said cup-shaped envelope parts so as to press said internal surface against the periphery of said massive member and thereby provide a good thermal connection between the semiconductor body and said envelope via said massive member.

11. A method of mounting a transistor in an envelope so as to provide efficient heat dissipation for the transistor through the envelope, said method comprising:

(a) providing a semiconductor body that includes emitter, collector and base electrodes in contact therewith and with the base electrode constituting a relatively massive metallic member on which the semiconductor body is mounted, at least a part of said member forming the base electrode, (b) providing an envelope at least a major part of which is metal and which major part is mainly tubular in shape, (c) inserting the semiconductor body with its emitter, collector and base electrodes and the relatively massive metallic member wholly within said mainly tubular metallic part of the envelope, and (d) radially inwardly deforming a portion of the internal surface of the mainly tubular metallic part of the envelope in the vicinity of said massive member and so as to press said internal surface against the massive member so that the massive member provides a good thermal connection between the semiconductor body and said metallic part of the envelope.

12. A method as set forth in claim 11 wherein the envelope includes a second metallic part and wherein said method further constitutes joining the second metallic part to the first-mentioned metallic part by cold pressure welding which welding induces the radially inwardly deformation that presses a portion of the internal surface of the metallic part of the envelope against the massive member.

References Cited by the Examiner

UNITED STATES PATENTS

| | | | |
|---|---|---|---|
| 2,810,873 | 10/57 | Knott | 317—235 |
| 2,854,610 | 9/58 | Waters et al. | 317—235 |
| 2,977,515 | 3/61 | Clark et al. | 317—234 |
| 2,981,876 | 4/61 | Willemse | 317—235 |
| 3,041,510 | 6/62 | Hower et al. | 317—235 |

FOREIGN PATENTS

| | | |
|---|---|---|
| 226,802 | 2/60 | Australia. |

JOHN W. HUCKERT, *Primary Examiner.*

JAMES D. KALLAM, DAVID J. GALVIN *Examiners.*